(12) United States Patent
He et al.

(10) Patent No.: US 9,266,521 B2
(45) Date of Patent: Feb. 23, 2016

(54) OPTIMIZED DE-INERTIA CONTROL METHOD FOR KINETIC HYBRIDS

(71) Applicants: Hongping He, Bakersfield, CA (US); Jing He, Sacramento, CA (US)

(72) Inventors: Hongping He, Bakersfield, CA (US); Jing He, Sacramento, CA (US)

(*) Notice: Subject to any disclaimer, the term of this patent is extended or adjusted under 35 U.S.C. 154(b) by 121 days.

(21) Appl. No.: 14/325,304

(22) Filed: Jul. 7, 2014

(65) Prior Publication Data

US 2016/0001762 A1    Jan. 7, 2016

(51) Int. Cl.

| | |
|---|---|
| *B60L 9/00* | (2006.01) |
| *B60L 11/00* | (2006.01) |
| *B60W 10/101* | (2012.01) |
| *B60W 10/06* | (2006.01) |
| *B60W 10/08* | (2006.01) |
| *G06F 7/00* | (2006.01) |
| *G06F 17/00* | (2006.01) |
| *G06F 19/00* | (2011.01) |
| *G01G 9/00* | (2006.01) |
| *B60K 6/10* | (2006.01) |

(52) U.S. Cl.
CPC ............ *B60W 10/101* (2013.01); *B60W 10/06* (2013.01); *B60W 10/08* (2013.01); *B60K 6/105* (2013.01); *B60W 2510/10* (2013.01); *B60W 2520/105* (2013.01); *B60W 2710/10* (2013.01)

(58) Field of Classification Search
CPC .............................. B60K 6/105; B60W 10/101
USPC ........................................ 701/22, 53; 73/865
See application file for complete search history.

(56) References Cited

U.S. PATENT DOCUMENTS

| 2010/0152982 A1* | 6/2010 | Bowman | B60K 6/105 701/53 |
| 2010/0192708 A1* | 8/2010 | Kees | B60K 6/105 73/865 |

* cited by examiner

*Primary Examiner* — Helal A Algahaim
*Assistant Examiner* — Mahmoud Ismail
(74) *Attorney, Agent, or Firm* — Manuel de la Cerra

(57) ABSTRACT

Method for CVT and powertrain control in a kinetic hybrid that integrates two constituent control strategies at the same time, one for the kinetic energy exchange between a vehicle and a flywheel to recover the vehicle's kinetic energy and to cancel the effect of the vehicle's inertia on changes in speed, and one for operating the kinetic hybrid's prime mover on its ideal operation line to optimize efficiency. Two different rates of change in the CVT ratio are computed in real time and are superimposed to realize both strategies. Using the combined rate of change in the CVT ratio derived by the present invention to control the powertrain, the primary power source need not expend a significant portion of its power to overcome the vehicle's inertia, and performance is not compromised.

8 Claims, 3 Drawing Sheets

OPTIMIZED DE-INERTIA CONTROL METHOD FOR KINETIC HYBRIDS

CROSS REFERENCE TO RELATED APPLICATION(S)

This application claims priority from U.S. Provisional Patent Application Ser. No. 61/843,634 filed Jul. 8, 2013 and 61/922,099, filed Dec. 31, 2013, which are incorporated by reference herein.

BACKGROUND OF THE INVENTION

1. Field of the Invention

The present invention pertains in general to a method of controlling the CVT in a vehicle powertrain. More particularly, the invention relates to a method of control for a kinetic hybrid vehicle, where the prime mover is either a motor, an engine, or a combination of both, and a flywheel acts as both a secondary power source and a secondary energy storage.

2. Description of the Related Art

Transportation accounts for a significant portion of global energy use and pollution, and there have been considerable efforts worldwide to promote new technology in transportation to improve fuel efficiency, aimed at promoting energy independence and reducing greenhouse gas emissions. As a result a market for hybrid vehicles and for electric vehicles has emerged, and many of the technologies being developed with raising the corporate-average fuel economy in mind have been directed at electric and hybrid vehicles.

Electric vehicles (EVs) and electric hybrids are able to bring improvements in efficiency from two main principles. One is to operate the primary power source (be it a motor or an engine) on the ideal operation line (IOL) for optimal efficiency. The other is to try to recover the vehicle's kinetic energy during deceleration (regenerative braking), which would otherwise be dissipated as heat in the brakes.

In conventional vehicles, efficiency is generally inversely related to performance. Engines should typically operate at a relatively high load for optimal efficiency, so relatively small engines are more efficient. However, relatively small engines have less reserve power, leading to poorer acceleration performance.

There are two components to the energy used to accelerate a vehicle: a portion used to overcome resistive forces like rolling resistance and air drag, and a portion used to overcome the vehicle's own inertia. Typically a vehicle requires its power source to provide a relatively high torque during acceleration, primarily to overcome inertia. When the vehicle is not accelerating or climbing a hill, the operation state of its primary power source lies below the IOL, resulting in low efficiency during most of the drive.

In a kinetic hybrid, where the vehicle's kinetic energy is recovered, stored, and reused kinetically, such as with a flywheel, countering the undesired effect of the vehicle's inertia is possible. Since a flywheel is a passive device, it should generally be controlled with a continuously variable transmission, or CVT, and control strategy is crucial in deciding how effectively the flywheel can contribute to increasing the vehicle's efficiency and performance. If the control is ineffective, the passive flywheel can become a "dead weight".

SUMMARY OF THE INVENTION

In automobiles, the vehicle's inertia affects the vehicle in two ways. Overcoming the vehicle's inertia accounts for a significant portion of the power required to attain the performance desired. When accelerating from rest, the portion of power used to overcome the vehicle's own inertia can easy be five or six times the portion used to overcome resistive forces. In a city cycle, close to half of the energy is wasted due to inertia: a portion of the energy used is stored in the kinetic energy of the vehicle and is wasted during deceleration. Although for most of the duration of a drive the vehicle is not accelerating significantly and power requirements are low, the engine (or primary power source) in a vehicle is generally sized according to the power requirements of acceleration, so that a certain level of acceleration performance is met. It is due to the passive effects of the vehicle's inertia on acceleration that vehicles must have an engine or motor that has high reserve power and consequently lower overall drive efficiency, operating below the ideal operation line (IOL).

If, however, there is a means to cancel the torque effect of the inertias at the vehicle driveshaft with a secondary power source (such as a flywheel), then the primary power source (an engine, a motor, or both) would only need to output enough torque to overcome rolling resistance, air drag, and internal losses, and could therefore be downsized considerably, resulting in lower cost, higher performance and higher efficiency.

(Note that the definition of hybrid used here refers to any vehicle having two or more sources of power for propulsion. There is a prime mover or primary power source, and a secondary mover or secondary power source, along with an energy storage that is used by the secondary power source; the energy supplied to the secondary power source generally comes from the prime mover, or from recovering the kinetic energy of the vehicle. In a kinetic hybrid, a flywheel storing kinetic energy acts as the secondary power source and as the secondary power storage.)

In the prior art flywheel hybrids, cancelling the torque effect of inertia either was not an objective, or if it was, the flywheel control method was imprecise and was not able to significantly cancel out the effects of the vehicle inertia and power source inertia(s) on the vehicle's performance.

The present invention provides a way to control a flywheel in a kinetic hybrid such that the torque of the flywheel on the vehicle driveshaft cancels out the passive torque effects of the vehicle's inertia due to changes in speed at the vehicle driveshaft in a significant and precise manner, reducing the power requirements of the primary power source and allowing for downsizing and its aforementioned benefits. In addition to providing a method to cancel the torque effects of the vehicle's inertia from the point of view of the primary power source, which is henceforth referred to as "de-inertia operation", the present invention also provides a means to simultaneously operate the vehicle's primary power source on its ideal operation line, or IOL.

In one aspect, the present invention provides a method of determining a first rate of change of CVT ratio according to the flywheel speed, the current CVT ratio, power source inertia(s), the vehicle inertia, the flywheel inertia, and the vehicle acceleration desired. This first rate of change of CVT ratio controls de-inertia operation.

In another aspect, the present invention provides a method of determining a second rate of change of CVT ratio according to an IOL torque output of the primary power source, the current CVT ratio, power source inertia(s), the flywheel inertia, and the flywheel speed. This second rate of change of CVT ratio controls the power flow between the primary power source and the flywheel, maintaining the primary power source on its IOL to optimize efficiency whenever it is active.

In another aspect, the present invention provides for the integration of these two rates of change in the CVT ratio to comprise an optimized de-inertia CVT ratio control, which simultaneously achieves de-inertia operation and operates the kinetic hybrid vehicle's primary power source on its IOL to optimize the vehicle's efficiency without sacrificing its performance.

DETAILED DESCRIPTION OF THE INVENTION

Figure 1:
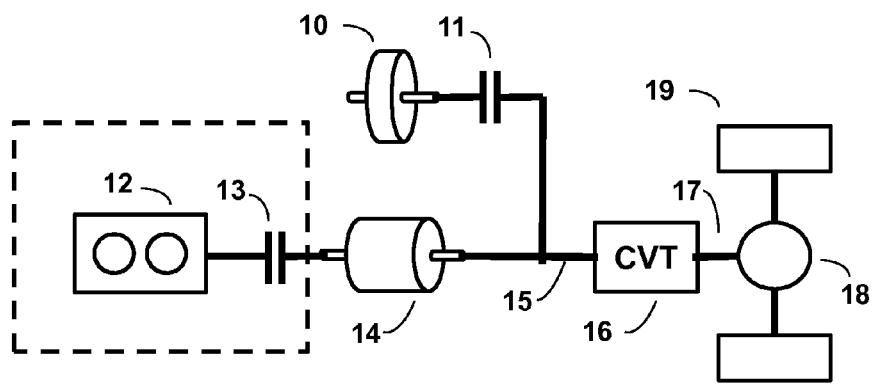
FIG. 1 depicts a kinetic hybrid powertrain structure with a CVT for use with the method of the present invention.

The present invention is described herein with reference to the drawings. In the drawings, like reference numerals represent like elements.

FIG. 1 represents a kinetic hybrid powertrain. The primary power source may be an internal combustion (IC) engine 12 or a traction motor/generator 14, or both may be present in a kinetic hybrid powertrain. In easily anticipated variations the engine 12 may be a turbine engine, or the primary power source may be considered to be some combination of one or more motors with at least one engine. If there is both an engine 12 and a motor 14 in the same powertrain, the motor 14 may be a through shaft motor and there may be an engine clutch 13 for coupling/decoupling the engine 12. The primary power source(s) is coupled to the input shaft 15 of a continuously variable transmission (CVT) 16, as is the flywheel 10 through the flywheel clutch 11, and the output shaft 17 of the CVT 16 is coupled to the final drive 18, which is connected to the vehicle's wheels 19. The CVT 16 may be any kind of continuously variable transmission, such as a mechanical CVT, an IVT, or an electric CVT (eCVT).

The CVT ratio R can be defined as $$R = \frac{\omega_F}{\omega_{DS}} = \frac{T_{CVT,o}}{T_{CVT,i}}$$

where $\omega_{DS}$ and $T_{CVT,o}$ are respectively the speed and torque at the output shaft 17 of the CVT 16, which is also the vehicle driveshaft, and $\omega_F$ and $T_{CVT,i}$ are respectively the speed and torque at the input shaft 15 of the CVT 16. Thus, the following relationships (1) and (2) hold:

$$\omega_F = \omega_{PS} = R \cdot \omega_{DS} \quad (1)$$

$$T_{CVT,o} = R \cdot T_{CVT,i} \quad (2)$$

Sensing the flywheel speed $\omega_F$ not only gives the flywheel energy level from $E = \frac{1}{2} I \omega^2$, but from the relationship between $\omega_F$ and the CVT ratio R expressed in (1) the rotational speed of the vehicle driveshaft $\omega_{DS}$ at the output port 17 of the CVT 16, and by extension the translational vehicle speed, are also known. Moreover, the speed of the primary power source $\omega_{PS}$ in this type of configuration is the same as $\omega_F$.

The torque relationship at the input shaft 15 of the CVT 16 is described by (3), while (4) describes the torque relationship at the output shaft 17 of the CVT 16.

$$T_{CVT,i} = T_{PS} - (I_{PS} + I_F) \cdot \dot{\omega}_F \quad (3)$$

$$T_{CVT,o} = T_R + I_{DS} \cdot \dot{\omega}_{DS} \quad (4)$$

where $T_R$ represents the total resistive torques of rolling resistance, air drag, and internal losses. $T_{PS}$ denotes the output torque of the primary power source(s), $I_{PS}$ represents the inertia of the power source(s) 12 and/or 14, $I_F$ is the inertia of the flywheel 10, $I_{DS}$ is the vehicle inertia as seen at the vehicle driveshaft 17, and $\dot{\omega}_4$ and $\dot{\omega}_{DS}$ respectively represent the acceleration of the flywheel 10 and the acceleration of the vehicle driveshaft 17. Making a substitution from (2) to (4), $$R \cdot T_{CVT,i} = T_R + I_{DS} \cdot \dot{\omega}_{DS} \quad (5)$$

and then substituting (3) into (5), $$R(T_{PS} - (I_{PS} + I_F) \dot{\omega}_F) = T_R + I_{DS} \cdot \dot{\omega}_{DS} \quad (6)$$

Differentiating (1), the following equation results:

$$\dot{\omega}_{PS} = \dot{\omega}_F = \dot{R} \omega_{DS} + R \dot{\omega}_{DS} \quad (7)$$

which can be also expressed as $$I_{DS} \cdot \dot{\omega}_{DS} = RT_{PS} - (I_{PS} + I_F) \dot{R} R \omega_{DS} - R^2 (I_{PS} + I_F) \dot{\omega}_{DS} T_R \quad (8)$$

by combining equations (6) and (7), and replacing $\dot{\omega}_F$ with the equivalent quantity from (7). Taking all the terms related to $\dot{\omega}_{DS}$ to the left side and the other terms to the right side, and making the substitution of $\omega_F$ in place of $R \omega_{DS}$, $$(R^2(I_{PS} + I_F) + I_{DS}) \dot{\omega}_{DS} = -\dot{R} \omega_F (I_{PS} + I_F) + RT_{PS} - T_R \quad (9)$$

Dividing the torque terms by the inertial terms to arrive at an expression for the driveshaft acceleration desired, the final form of the dynamic equation at the vehicle driveshaft 17 would be:

$$\alpha_{DS} = \dot{\omega}_{DS} = \frac{-\dot{R}\omega_F(I_{PS} + I_F) + T_{PS}R - T_R}{I_{DS} + R^2(I_{PS} + I_F)} \quad (10)$$

where $\alpha_{DS}$ is the desired driveshaft acceleration; $\dot{R}$ is the rate of change in the CVT ratio R; $I_{DS}$, $I_{PS}$, and $I_F$ are respectively the inertias for the vehicle at the vehicle driveshaft 17, the primary power source(s) 12 and/or 14, and the flywheel 10; $T_{PS}$ is the output torque from the primary power source(s) 12 and/or 14; $\omega_F = \omega_{PS} = R \cdot \omega_{DS}$ is the speed of the primary power source(s) 12 and/or 14 and the flywheel 10; and $T_R$ is the sum of resistive torques (rolling resistance plus air drag plus any internal losses) acting on the vehicle driveshaft 17. It should be noted that if/when the primary power source 12 and/or 14 is decoupled from the powertrain, $I_{PS} = 0$.

(10) is the dynamic equation governing all kinetic hybrid powertrains of this structure, and serves as the basis for deriving the precise kinetic hybrid powertrain control methods shown later. The quantities in the numerator of the dynamic equation are torque terms, and the quantities in the denominator of the dynamic equation are inertial terms. The inertias on the denominator are passive quantities, but for any given acceleration $\alpha_{DS}$ demanded by the operator of the vehicle, the inertias result in a torque in the quantity of $(R^2(I_{PS} + I_F) + I_{DS}) \alpha_{DS}$ that resists changes in speed.

Consider the dynamic relationship between the inertias and torques at the vehicle driveshaft for a conventional vehicle. There is no flywheel or flywheel inertia, so equation (9) simplifies to $(R^2 \cdot I_E + I_{DS}) \dot{\omega}_{DS} = -\dot{R} \omega_E I_E + RT_E - T_R$, where $I_E$, $\omega_E$, and $T_E$ are the engine's inertia, speed, and torque, respectively. In reality the engine inertia is much smaller than the vehicle inertia, so the $(R^2 \cdot I_E + I_{DS}) \dot{\omega}_{DS}$ term is not large and simplifies to $R^2 I_{DS} \omega_{DS}$. This term can be many times $T_R$ during acceleration, and it is in consideration of this $R^2 I_{DS} \dot{\omega}_{DS}$ torque term that the engine needs to be sized relatively larger and relatively less efficient to have enough reserve power or torque to overcome the undesirable torque effects of the vehicle's inertia.

The following steps show the derivation for a first rate of change in the CVT ratio $\dot{R}_1$, which enables the powertrain to perform de-inertia operation.

By multiplying the desired driveshaft acceleration by the inertial components in the denominator, (10) can be rewritten as $$R \cdot T_{PS} = (R^2(I_{PS}+I_F)+I_{DS})\alpha_{DS} + \dot{R}\cdot\omega_F(I_{PS}+I_F) + T_R \quad (11)$$

The vehicle inertia is $I_{DS}$, the inertias of the primary power source 12 and/or 14 and the flywheel 10 are $(I_{PS}+I_F)$, and the term $(R^2(I_{PS}+I_F)+I_{DS})\alpha_{DS}$ represents the torque that these inertias produce on the vehicle driveshaft 17 when the desired acceleration $\alpha_{DS}$ is achieved. The CVT 16 is the means by which torque into and out of the flywheel 10 can be controlled, and the CVT 16 is controlled by $\dot{R}$, the rate of change of the CVT ratio R. Letting $$(R^2(I_{PS}+I_F)+I_{DS})\alpha_{DS} + \dot{R}\cdot\omega_F(I_{PS}+I_F) = 0$$

so that the torque effects of inertia on the driveshaft are cancelled by the torque $\dot{R}$ commands from the flywheel, then it follows that $$\dot{R}_1 = \frac{-[(I_{PS}+I_F)R^2 + I_{DS}]\alpha_{DS}}{\omega_F(I_{PS}+I_F)} \quad (12)$$

It should be recognized here that when the CVT 16 and the flywheel 10 are controlled using the $\dot{R}$ expressed in (12), (11) simplifies to $$RT_{PS} = T_R \quad (13)$$

and the primary power source only needs to output $T_{PS} = T_R/R$ regardless of the acceleration demand! From the point of view of the primary power source 312 and/or 314, therefore, the vehicle inertia is irrelevant to the power/acceleration demand at the vehicle driveshaft. This is why this control method is named de-inertia operation.

Since the primary power source is no longer responsible for overcoming the torque effect that the vehicle inertia produces on the vehicle driveshaft, the output torque demanded of the primary power source is considerably lower, so the primary power source may be downsized. If the primary power source is not downsized, the vehicle will have improved performance as the primary power source will have more reserve torque with de-inertia operation.

This is possible because the inertial component of vehicle acceleration and deceleration is handled by the flywheel. When the vehicle accelerates, the flywheel contributes torque to overcome the effects of the vehicle's inertia, allowing the vehicle to accelerate more easily, and when the vehicle decelerates, the flywheel stores the vehicle's kinetic energy, allowing the vehicle to decelerate more easily. Thus the component of the vehicle's kinetic energy in the vehicle's inertia is not wasted, and this energy can be stored in the flywheel with the exception of transmission (i.e., CVT) and spin losses. There are no energy conversion losses, so the process may be more efficient than energy recovery in electric hybrids. Moreover, the flywheel is not limited by its power density, unlike electric motors and batteries. De-inertia operation should be the most complete form of vehicle energy recovery and reuse.

Figure 2A:
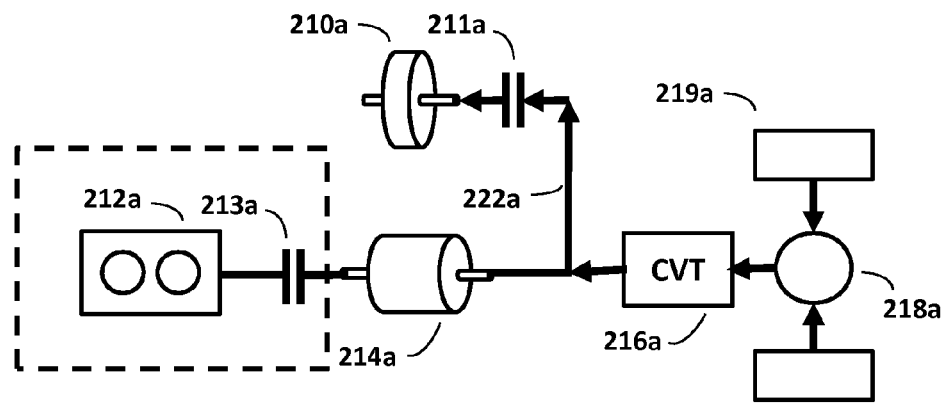
FIG. 2A and FIG. 2B show the de-inertia operation concept as analogous to noise suppression.

As depicted in FIG. 2(a), when the powertrain encounters a deceleration demand from the operator of the vehicle and there is kinetic energy to recover at the wheels 219a and the final drive 218a, $\dot{R}_1$ is positive since $\alpha_{DS}$ is negative, so the ratio of the CVT 216a is increased and the flywheel clutch 211a is engaged to allow for the flow of kinetic energy from the wheels 219a into the flywheel 210a along a mechanical path, providing for high efficiency energy recovery.

Figure 2B:
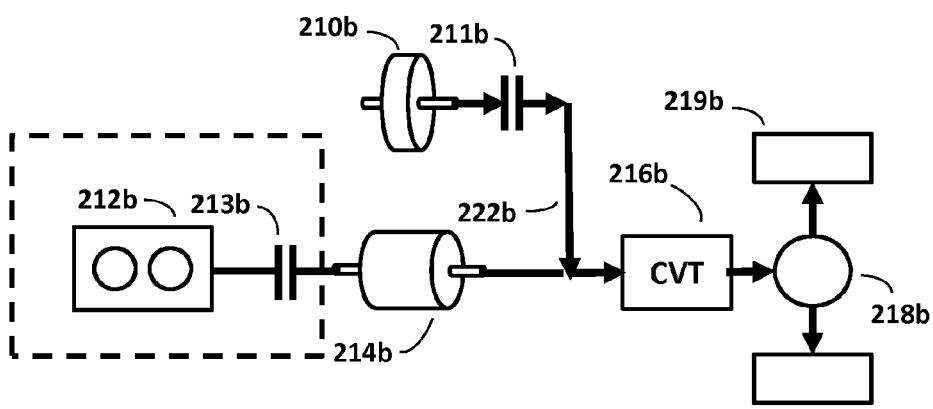

When there is an acceleration demand from the operator of the vehicle as shown in FIG. 2(b), the flywheel clutch 211b is engaged and $\dot{R}_1$ is negative since $\alpha_{DS}$ is positive, so the ratio of the CVT 216b is decreased so that the kinetic energy stored into the flywheel 210b (which acts as a kinetic power source) is released along a mechanical path through the CVT 216b and the final drive 218b to the wheels 219b.

Collectively, the processes of storing the vehicle's kinetic energy into the flywheel and of releasing the flywheel's kinetic energy to the vehicle, respectively described by FIGS. 2(a) and 2(b), represent an exchange of kinetic energy that is characteristic of de-inertia operation. The idea is that as vehicle kinetic energy decreases, flywheel kinetic energy increases, and vice versa so that up to a certain vehicle speed the sum of the kinetic energies of the vehicle and the flywheel is roughly constant.

It should be noted that although $\dot{R}_1$ can be calculated in real time, $\dot{R}_1$ can also be simulated with a predetermined function or look-up table based on the vehicle speed and on the CVT ratio. Alternatively, through experimentation values of $\dot{R}_1$ can be stored in program memory or in a table instead of being computed in real time. These approaches should be considered equivalent to the method of the present invention.

Although de-inertia operation in itself takes care of one of the principles to improve vehicle efficiency, it would be even more desirable if the other principle of running the primary power source on its IOL could be achieved simultaneously, as indeed it can.

Simultaneously implementing both energy saving principles can be accomplished if two rates of CVT ratio change are considered, $\dot{R}_1$ and $\dot{R}_2$. Let $\dot{R}_1$ be the rate of change of CVT ratio for implementation of de-inertia operation, as before.

Now the goal is to operate the primary power source on its IOL so that $$T_{PS} = T_{IOL}$$

However, the IOL torque is likely to be much higher than the torque desired or demanded by the operator of the vehicle, and without a plan of control the vehicle would accelerate past the speed desired.

This problem can be solved by using an energy buffer (i.e., flywheel) to modulate the primary power source on or off so that when it is on it is operating on the IOL, and drives the vehicle while charging the energy buffer; then in the off state, the energy buffer (the flywheel in a kinetic hybrid) drives the vehicle. Here the present invention differentiates itself from many flywheel hybrids of the prior art that were researched and developed from the perspective of energy recovery or from the perspective of substituting flywheels for batteries, and did not address de-inertia operation or IOL operation.

The key to employing de-inertia operation and modulated IOL operation at the same time is to consider the overall control signal $\dot{R}$ as the sum of two constituent components $\dot{R}_1$ and $\dot{R}_2$ so the dynamic equation for controlling the hybrid drivetrain then becomes:

$$\alpha_{DS} = \frac{-(\dot{R}_1 + \dot{R}_2)\omega_F(I_{PS} + I_F) + RT_{IOL} - T_R}{I_{DS} + R^2(I_{PS} + I_F)} \quad (14)$$

Then, to derive $\dot{R}_2$, make the substitution of (12) for $\dot{R}_1$ in (14), $$\dot{R}_1 = \frac{-[(I_{PS} + I_F)R^2 + I_{DS}]\alpha_{DS}}{\omega_F(I_{PS} + I_F)} \quad \text{(from 12)}$$

and commanding $T_{PS}=T_{IOL}$ $$[I_{DS} + R^2(I_{PS} + I_F)]\alpha_{DS} =$$
$$-\left(\frac{-[(I_F + I_{PS})R^2 + I_{DS}]\alpha_{DS}}{\omega_F(I_{PS} + I_{PS})} + \dot{R}_2\right)\omega_F(I_{PS} + I_F) + RT_{IOL} - T_R,$$

which simplifies to $$[I_{DS}+R^2(I_{PS}+I_F)]\alpha_{DS}=[(I_F+I_{PS})R^2+I_{DS}]\alpha_{DS}-\dot{R}_2\omega_F(I_{PS}+I_F)+RT_{IOL}-T_R,$$

which simplifies to $$\dot{R}_2 = \frac{RT_{IOL} - T_R}{\omega_F(I_{PS} + I_F)},$$

which applies whenever $T_{PS}=T_{IOL}$.

However, in order to operate the flywheel also as an energy buffer for the primary power source in an optimal way, there would be times when $T_{PS}=0$ (after the flywheel 10 is charged up to a certain point, the primary power source is turned off and the flywheel drives the vehicle). Control of the vehicle drivetrain may take place in two phases or modes.

In the first phase or mode, the primary power source is on, and the IOL torque is used throughout.

$$\dot{R}_2 = \frac{RT_{IOL} - T_R}{\omega_F(I_{PS} + I_F)} \quad (15)$$

Therefore, in the first phase, the primary power source torque $T_{IOL}$ is split into two paths: one to overcome $T_R$ to drive the vehicle, and another to charge the flywheel 10. This is more apparent if (15) is rewritten as:

$$RT_{IOL}=\dot{R}_2\omega_F(I_{PS}+I_F)+T_R \quad \text{(from 15)}$$

In the second phase or mode of vehicle drivetrain control, the primary power source is off and may or may not be decoupled from the vehicle drivetrain. The resulting second rate of CVT ratio change would be $$\dot{R}_2 = \frac{-T_R}{\omega_F(I_{PS} + I_F)} \quad (16)$$

In the second mode, the flywheel supplies torque to overcome $T_R$ and drive the vehicle.

$$T_R=-\dot{R}_2\omega_F(I_{PS}+I_F) \quad \text{(from 16)}$$

Figure 3A:
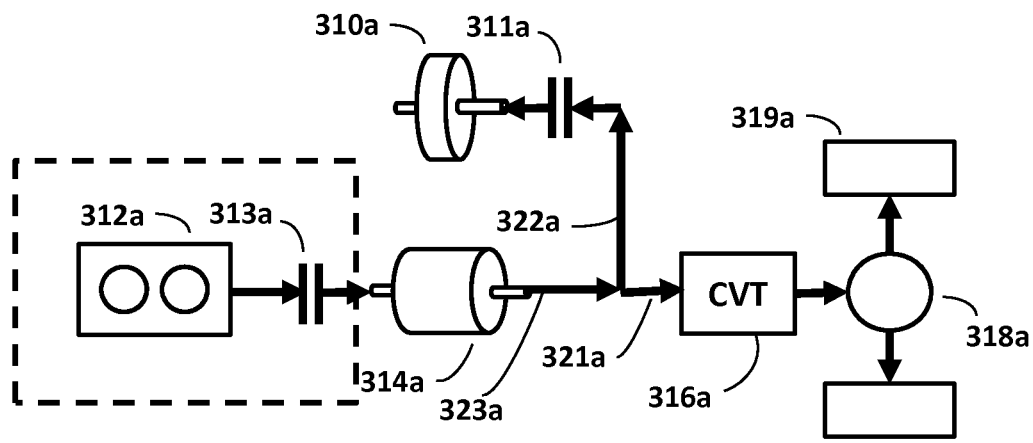
FIG. 3A and FIG. 3B illustrate a kinetic hybrid vehicle's kinetic energy level and its flywheel's kinetic energy level in de-inertia operation as a function of the vehicle's speed in intervals of 10 km/h.
Figure 3B:
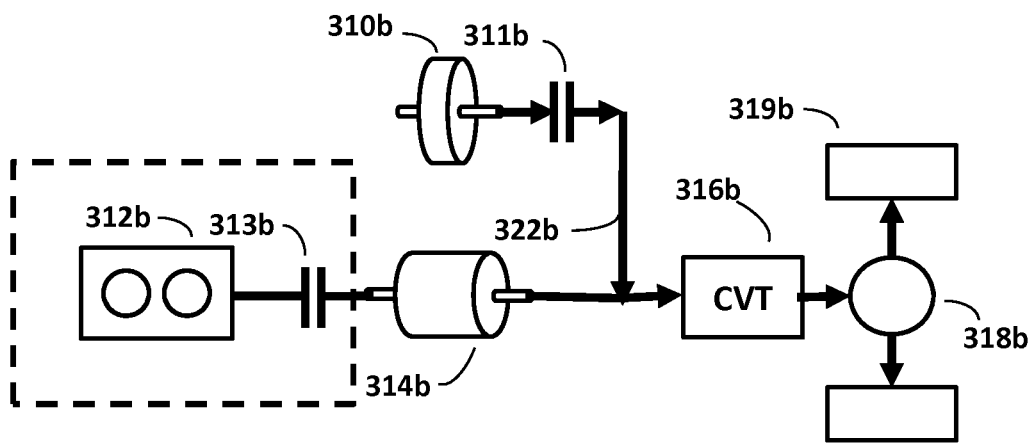

FIGS. 3(a) and 3(b) illustrate the two phases of vehicle operation associated with the second rate of change in the CVT ratio, $\dot{R}_2$. The primary power source (some combination of the engine 312a/312b and the motor 314a/314b) can be alternately operated on its IOL or turned off or idle. FIG. 3(a) is associated with the first phase and the $\dot{R}_2$ of (15). FIG. 3(b) is associated with the second phase and the $\dot{R}_2$ of (16).

While the primary power source 312a and/or 314a is on and operated on the IOL, the IOL torque 323a it produces is split into two portions, depicted in FIG. 3(a). A first portion 321a of the IOL torque or energy 323a is passed along a mechanical path through the CVT 316a and the final drive 318a to the wheels 319a, in order to meet the torque demanded at the driveshaft. A second portion 322a of the IOL torque or energy 323a represents the excess torque (IOL torque 323a minus the instantaneous torque demanded), which is passed to the flywheel 310a while the flywheel clutch 311a is engaged and is stored for later use. In the first phase of operating the vehicle with $\dot{R}_2$, the primary power source 312a and/or 314a simultaneously handles the transient torque demands at the driveshaft and charges the flywheel 310a if there is excess torque 322a. IOL torque 323a is greater than the resistive torques, so $\dot{R}_2$ is positive and the CVT ratio R increases in the first phase.

When it becomes desirable to release the energy stored inside the flywheel 310b, the vehicle enters a second phase, where the primary power source 312a and/or 314a is either switched off or allowed to idle, as shown in FIG. 3(b). Because the CVT ratio R decreases in the second phase ($\dot{R}_2$ negative), the flywheel 310b releases its kinetic energy as 322b to drive the vehicle until it becomes desirable to have the powertrain operate in the first phase again.

Controlling the kinetic hybrid vehicle powertrain with $\dot{R}_1$ need not be mutually exclusive with controlling the kinetic hybrid vehicle powertrain with $\dot{R}_2$; in fact, these two rates of change of ratio for the CVT ratio should be superimposed into a single $\dot{R}=\dot{R}_1+\dot{R}_2$ to achieve optimal efficiency without sacrificing performance.

It is well known in the art to use closed-loop control such as a PID (proportional integral derivative) to minimize errors, and it is natural to apply this to the combined R before manipulating the CVT ratio.

Under the method of optimized de-inertia operation, the CVT is controlled by the sum of two different rates of change in the CVT ratio, $\dot{R}_1$ and $\dot{R}_2$. $\dot{R}_1$ is responsible for de-inertia operation and handling acceleration and deceleration. $\dot{R}_2$ is responsible for having the flywheel absorb the excess power produced by the primary power source running in its most efficient state in the first phase, and is also responsible for the release of power from the flywheel to the vehicle driveshaft to maintain the vehicle speed and overcome resistive torques while the primary power source is turned off or idle in the second phase.

By controlling the CVT using the sum of $\dot{R}_1$ and $\dot{R}_2$, the flywheel can be used simultaneously for kinetic energy exchange between the vehicle and the flywheel to carry out de-inertia operation, cancelling the undesirable torque effects of the vehicle's inertia on vehicle acceleration and deceleration, and as an energy buffer, enabling the primary power source to always run at optimal efficiency whenever it is turned on.

With the optimized de-inertia CVT ratio control method of the present invention both energy saving principles of hybrids can be realized simultaneously to the fullest extent possible.

In the prior art flywheel hybrids used separate transmissions for the prime power source and for the flywheel due to conflicting control strategies that each required. Another innate benefit of the present invention is that by using the optimized de-inertia operation control method, the kinetic hybrid vehicle powertrain can be controlled with just a single transmission, reducing cost as well as improving efficiency without compromising performance.

What is claimed is:

1. A method of operating a hybrid powered vehicle having a flywheel, a power source that is comprised of at least one of an engine and an electric motor/generator, and a continuously variable transmission, comprising the steps of:
   (a) sensing a flywheel speed;
   (b) sensing a continuously variable transmission (CVT) ratio;
   (c) sensing a signal for acceleration demand from an operator of the vehicle;
   (d) obtaining a first rate of change of ratio for the continuously variable transmission from a mathematical relationship involving a flywheel inertia, a power source inertia, the flywheel speed, the continuously variable transmission ratio, and the signal for acceleration demand;
   (e) obtaining a second rate of change of ratio for the continuously variable transmission from a mathematical relationship involving the flywheel speed, the continuously variable transmission ratio, the flywheel inertia, the power source inertia, an operation line output torque for the power source, and an estimate of resistive torques acting on a vehicle driveshaft;
   (f) combining the first and second rates of change of ratio for the continuously variable transmission by summing them and manipulating the continuously variable transmission ratio and a power flow within the hybrid vehicle powertrain using the combined rate of change of ratio for the continuously variable transmission.

2. The method of claim 1, wherein step (d) is comprised of the following steps:
   (i) converting the signal for acceleration demand into a desired acceleration at the vehicle driveshaft;
   (ii) obtaining the sum of the flywheel inertia and the power source inertia, which may be a fixed quantity;
   (iii) squaring the continuously variable transmission ratio and multiplying the result by the quantity obtained in step (ii);
   (iv) adding the vehicle inertia seen at the vehicle driveshaft to the quantity obtained from step (iii);
   (v) multiplying the quantity obtained from step (iv) with the desired acceleration obtained in step (i);
   (vi) multiplying the quantity obtained from step (ii) by an angular flywheel speed;
   (vii) dividing the quantity obtained in step (v) by the quantity obtained in step (vi);
   (viii) arriving at a first rate of change of ratio for the continuously variable transmission that is the negative of the result obtained in step (vii).

3. The method of claim 1, wherein step (e) is comprised of the following steps:
   (i) obtaining the sum of the flywheel inertia and the power source inertia, which may be a fixed quantity;
   (ii) multiplying the quantity from step (i) by an angular flywheel speed;
   (iii) obtaining an estimate of the total resistive torques acting on the vehicle driveshaft in real time;
   (iv) determining whether a powertrain is operating within a first phase or second phase of operation, wherein the power source is on during a first phase of operation, and the power source is off or idle during a second phase of operation;
   (v) during a first phase of operation, obtaining the product of the CVT ratio and an operation line output torque for the power source corresponding to a power source speed;
   (vi) subtracting the quantity from step (iii) from the result of step (v) if in a first phase of operation, or subtracting the quantity from step (iii) from zero if in a second phase of operation;
   (vii) arriving at a second rate of change of ratio for the CVT by dividing the result from step (vi) by the result from step (ii).

4. The method of claim 1, wherein step (f) further consists of applying a filter to the combined rate of change of ratio for the CVT.

5. The method of claim 4, wherein the filter applied is a PID filter.

6. The method of claim 3, wherein the power source is constrained to be operated on an operation line during the first phase.

7. The method of claim 3, wherein the power source may be decoupled from the powertrain during the second phase and the power source inertia used in the calculations of step (e) is zero if decoupled.

8. The method of claim 1, wherein the calculations of step (d) may be substituted with a predetermined function or look-up table based on prior calculation or experimentation, and the first rate of change of ratio for the continuously variable transmission is obtained from the function or look-up table.

* * * * *